(12) United States Patent
Albright et al.

(10) Patent No.: US 6,733,062 B1
(45) Date of Patent: May 11, 2004

(54) COMBINED TAILGATE AND HINGED ENGINE COVER

(75) Inventors: Larry E. Albright, Gwinner, ND (US); Dan A. Frederick, Forman, ND (US)

(73) Assignee: Clark Equipment Company, Woodcliff Lake, NJ (US)

( * ) Notice: Subject to any disclaimer, the term of this patent is extended or adjusted under 35 U.S.C. 154(b) by 0 days.

(21) Appl. No.: 10/287,160

(22) Filed: Nov. 4, 2002

(51) Int. Cl.[7] ............................................... B62D 25/10
(52) U.S. Cl. ........................ 296/51; 180/69.21; 49/142; 49/166
(58) Field of Search .................... 296/50, 51; 180/69.2, 180/69.21; 49/142, 166

(56) References Cited

U.S. PATENT DOCUMENTS

| 2,041,522 A | 5/1936 | Breer ........................... 180/69 |
| 2,413,792 A | 1/1947 | Sharp ........................... 180/69 |
| 2,868,310 A | 1/1959 | Lee ............................... 180/89 |
| 3,828,952 A | 8/1974 | Klee ............................ 214/140 |
| 4,055,262 A | 10/1977 | Bauer et al. ................. 214/140 |
| 4,287,961 A | 9/1981 | Steiger ...................... 180/68 R |
| 4,319,653 A | 3/1982 | Carlson .................... 180/89.17 |
| 4,415,052 A | 11/1983 | Gauer ........................ 180/69 R |
| 4,458,774 A | 7/1984 | Sieren ........................ 180/69.2 |
| 5,029,918 A * | 7/1991 | Albright et al. ............. 293/126 |
| D322,792 S | 12/1991 | Park ............................ D15/25 |
| 5,730,239 A | 3/1998 | Holter ...................... 180/69.21 |
| 5,730,240 A | 3/1998 | Hoffman et al. ......... 180/69.21 |
| 6,066,802 A * | 5/2000 | Reinke et al. |
| 6,109,676 A | 8/2000 | Avis et al. ................... 293/149 |
| 6,205,665 B1 | 3/2001 | Anderson et al. .......... 29/897.2 |

* cited by examiner

*Primary Examiner*—Dennis H. Pedder
(74) *Attorney, Agent, or Firm*—Westman, Champlin & Kelly, P.A.

(57) ABSTRACT

A skid steer loader has a rear mounted engine and a tailgate that pivots about a vertical axis, and the tailgate in turn carries an engine cover panel that is pivoted to the tailgate about a horizontal axis. When the tailgate is closed, the engine cover panel overlies the loader engine and other components for the skid steer loader, and provides protection and covers such components. The engine cover panel is made so that it will move upwardly for access to the components and swings away with the tailgate for access to the engine compartment.

15 Claims, 6 Drawing Sheets

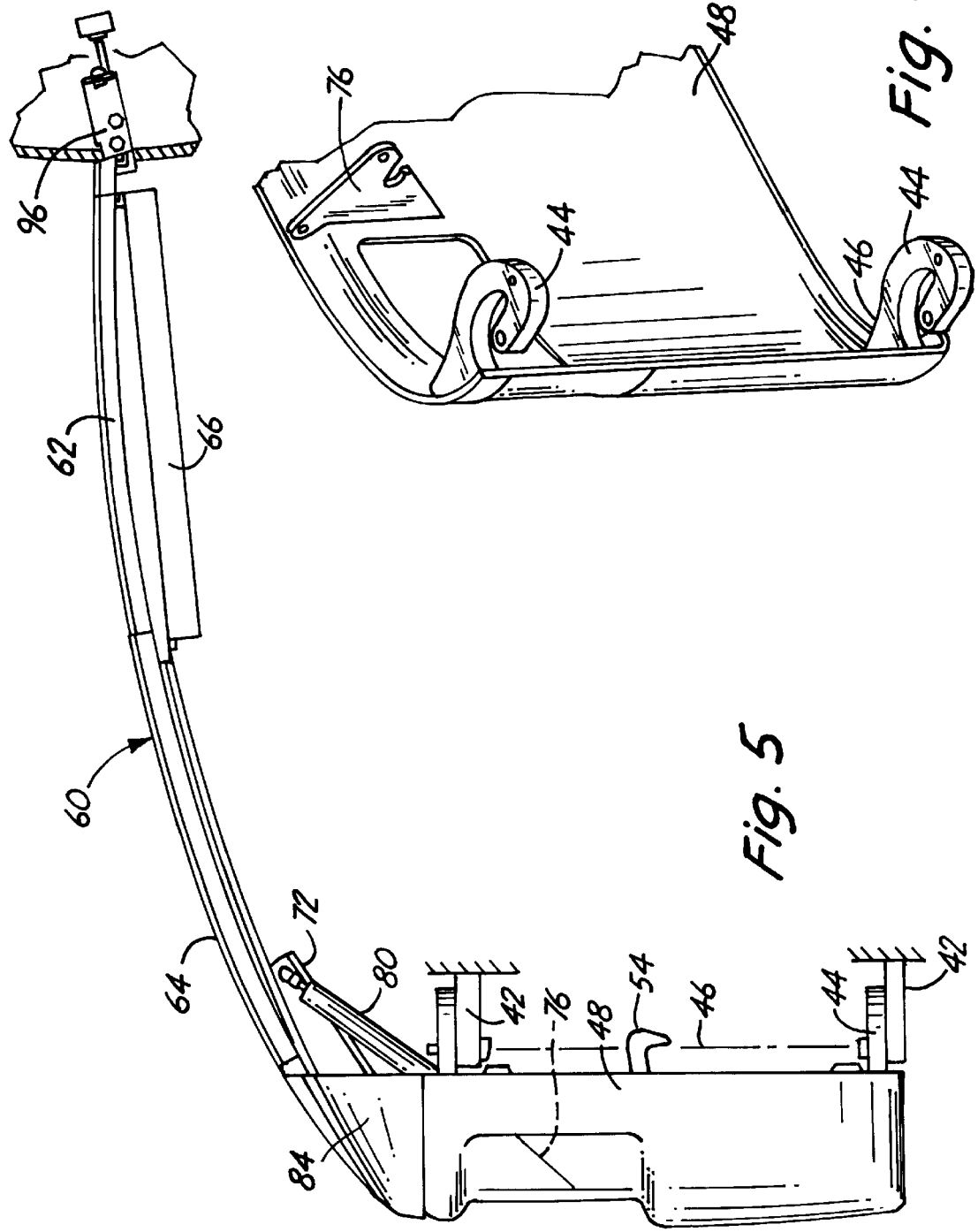

COMBINED TAILGATE AND HINGED ENGINE COVER

BACKGROUND OF THE INVENTION

The present invention relates to a combined tailgate and engine cover for a self-propelled loader, having a rear mounted engine, in particular with skid steer loaders that are very compact. The engine cover hinges on the tailgate, which permits raising the engine cover for access to service components directly underneath it, and the tailgate, which normally swings open about a vertical axis, will carry the engine cover with it, when the tailgate is open, for full access to the engine and its other components.

Skid steer loaders have tailgates that open about a vertical axis, along one lateral side of the loader frame. The open tailgate provides a full access to the engine components of a rear mounted engine. Skid steer loaders in particular have to be very compact, but yet it is desirable to have easy access to service components and yet keep them covered for impact protection.

The tailgates that are used on skid steer loaders are heavy so they add counterweight and also provide some resistance to denting and damage if the loader is backed into a fixed object. Because loaders are used in construction sites, various objects can strike the loader, so it is also desirable to have service components such as fluid fillers, caps, filters and the like recessed or covered.

SUMMARY OF THE INVENTION

The present invention relates to a generally horizontally extending engine cover that is hinged to a generally vertically extending tailgate. The engine cover is hinged to the tailgate about a horizontal axis, while the tailgate is hinged to a frame of a loader, such as a skid steer loader, about a vertical axis. When the engine cover is raised from its covering and latched position, it can be swung with the tailgate about the vertical axis of the tailgate so that it is completely out of the way for servicing engine components that are within the chamber covered by the tailgate and the engine cover.

Because the engine cover can be raised independently about a horizontal axis relative to the frame of the loader and the tailgate, it can be lifted for servicing, checking fluid levels, adding fluid, and other routine service activities, without opening the heavy tailgate or pivoting the existing cab out of the way, which is sometimes required if the components are covered.

This permits one to place a cover over things such as filters, filler caps, breather caps, and similar items that normally would protrude from the exterior of the vehicle because they now can be accessed easily.

When service is to be performed with the present invention, the engine cover can be raised for many service functions, and then the tailgate swung about its vertical axis so that the engine cover and the tailgate are fully out of the way to permit servicing the engine fully, and performing repairs.

The skid steer loader shown has a forwardly pivoting cab, and the cab is latched in a working position when the cab is properly closed. The latch handles on the cab must be closed for the engine cover to close and latch. Thus the engine cover will not latch unless the cab is latched first. If the cab is not latched in working position, but the cover has been opened, the operator cannot inadvertently latch the engine cover while leaving the cab in a partially released position.

BRIEF DESCRIPTION OF THE DRAWINGS

FIG. 4 is a fragmentary perspective view of the tailgate showing the tailgate hinge that permits supporting the tailgate along one side thereof about a vertical axis;

FIG. 5 is a side elevational view of the tailgate and engine cover assembly of the present invention with the skid steer loader only a schematic showing of the tailgate hinge support on;

DETAILED DESCRIPTION OF THE PREFERRED EMBODIMENTS

Figure 1:
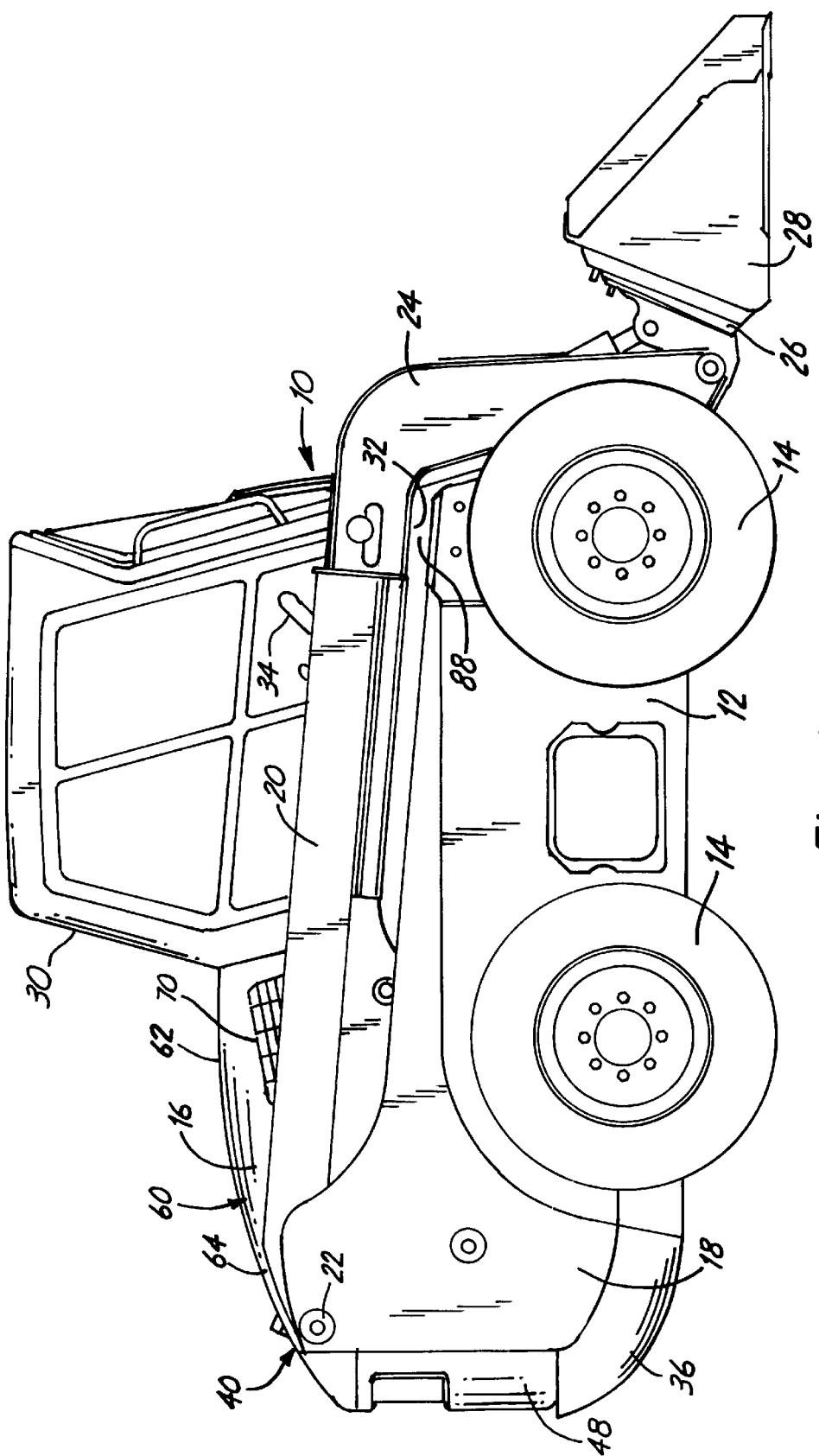
FIG. 1 is a side elevational view of a loader having a combined engine cover and tailgate made according to the present invention.

Referring to FIG. 1, a skid steer loader 10 has a main frame 12 that is constructed in a known manner, and includes drive wheels 14 that can be driven from an engine in an engine compartment 16 in a usual manner using hydrostatic drive, or other similar known drive. The frame 12 has frame uprights 18 on opposite sides thereof for pivotally mounting lift arms 20 about a horizontal pivot 22 on the frame uprights 18. The front ends of the lift arms, which in this form are telescoping lift arms have frame members 24, mounting a pivoting attachment plate 26, on which a working tool such as a bucket 28, can be mounted. The lift arms can be moved about their pivots with lift cylinders 17 (FIG. 3).

Figure 3:
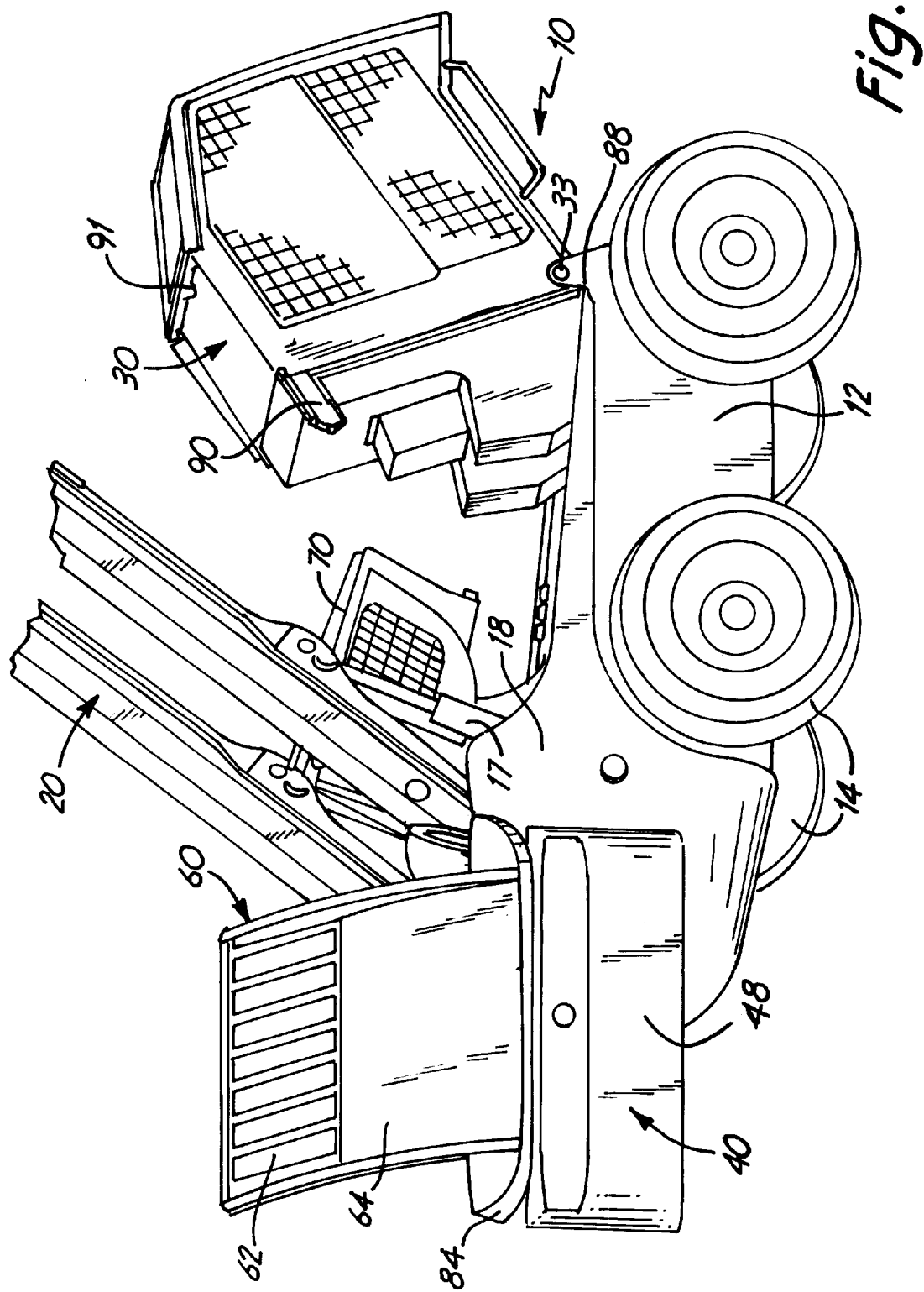
FIG. 3 is a schematic view of the loader of FIG. 1 with a tailgate and engine cover in a fully open position, and with a cab illustrated rotated pivoted forwardly for access to components in the frame of the loader.

An operator's cab 30 is mounted on pivot support 32 on frame 12 (see FIG. 3 as well) so that the cab 30 can be pivoted forwardly, as shown in FIG. 3, from its working position that is shown in FIG. 1. The cab has operator control levers 34 for controlling the forward and rearward movement of the skid steer loader in a normal manner, through drive components.

The frame 12 has a formed belly pan 36 at the rear portions thereof, that is secured to other portions of the frame and this provides a skid plate, bumper and rounded surfaces for aesthetic purposes. A combined tailgate and engine cover assembly indicated at 40 is pivotally mounted to the frame 12 in a known manner, on arms or supports 42 about an upright pivot axis 46. The arms or supports are shown schematically in FIG. 5 and they extend to pivotally mount hinge members 44 that are fixed to the tailgate 48, along one edge (see also FIG. 4). The pivot axis 46 is formed with pivot pins. Hinges 44 are mounted onto the tailgate 48 shown in FIG. 4.

Figure 2:
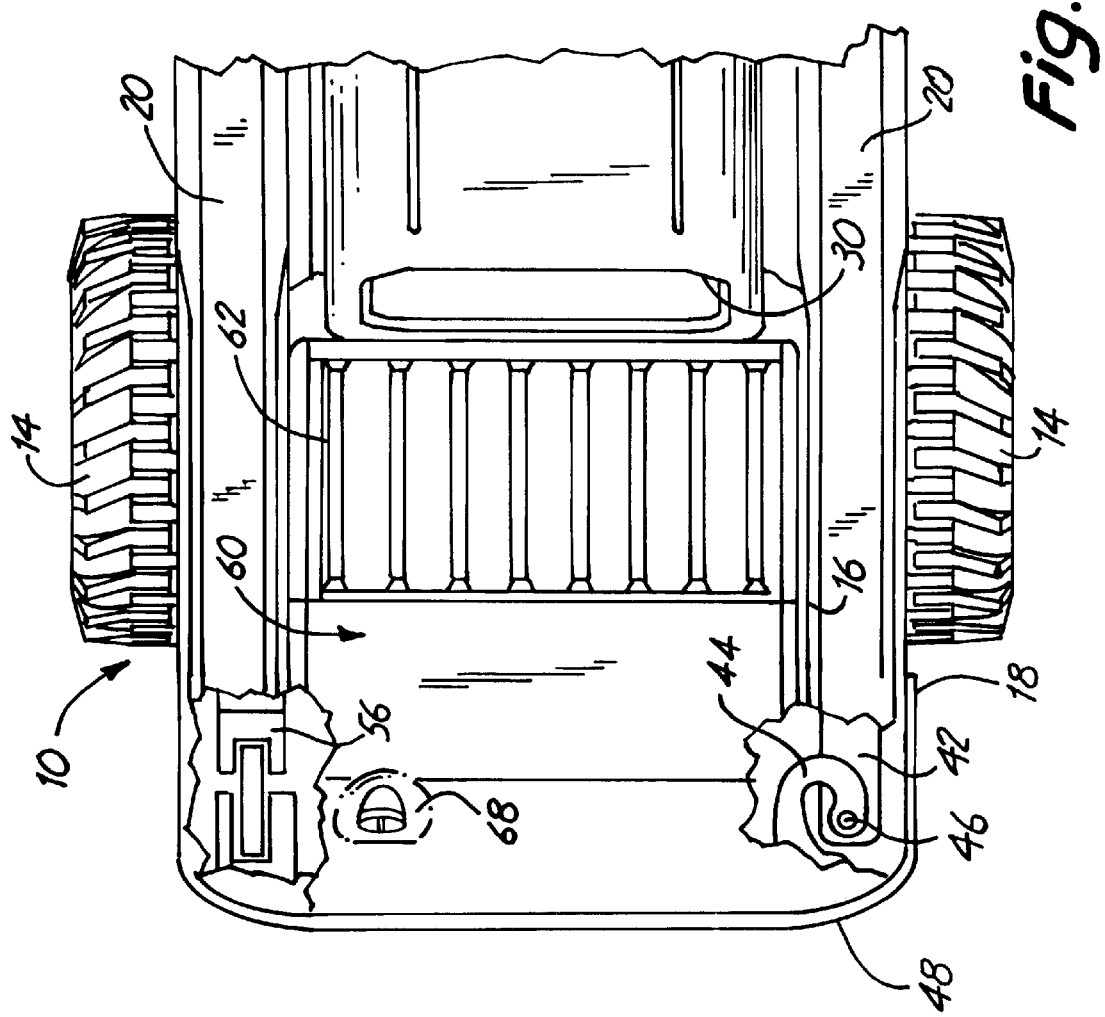
FIG. 2 is a fragmentary top plan view showing the engine cover and tailgate in a closed position.

The tailgate member can be constructed as desired and may be formed in sections and welded or partially formed or cast. The tailgate 48 includes a latch assembly 50 that preferably is a two stage latch, which includes a primary hook 52 for full latching or fully closed, and a secondary hook 54, which is shown schematically in FIG. 2, that will hook onto a bracket 56 on the frame of the skid steer loader. Hook 54 will prevent opening of the tailgate even if the primary latch 52 is released until it is lifted to a release position. A suitable latch release lever 58 can be provided for releasing the latches.

The tailgate latches are conventional, and are illustrated to show that the tailgate can be retained from pivoting about its vertical axis 46 in working position.

Figure 6:
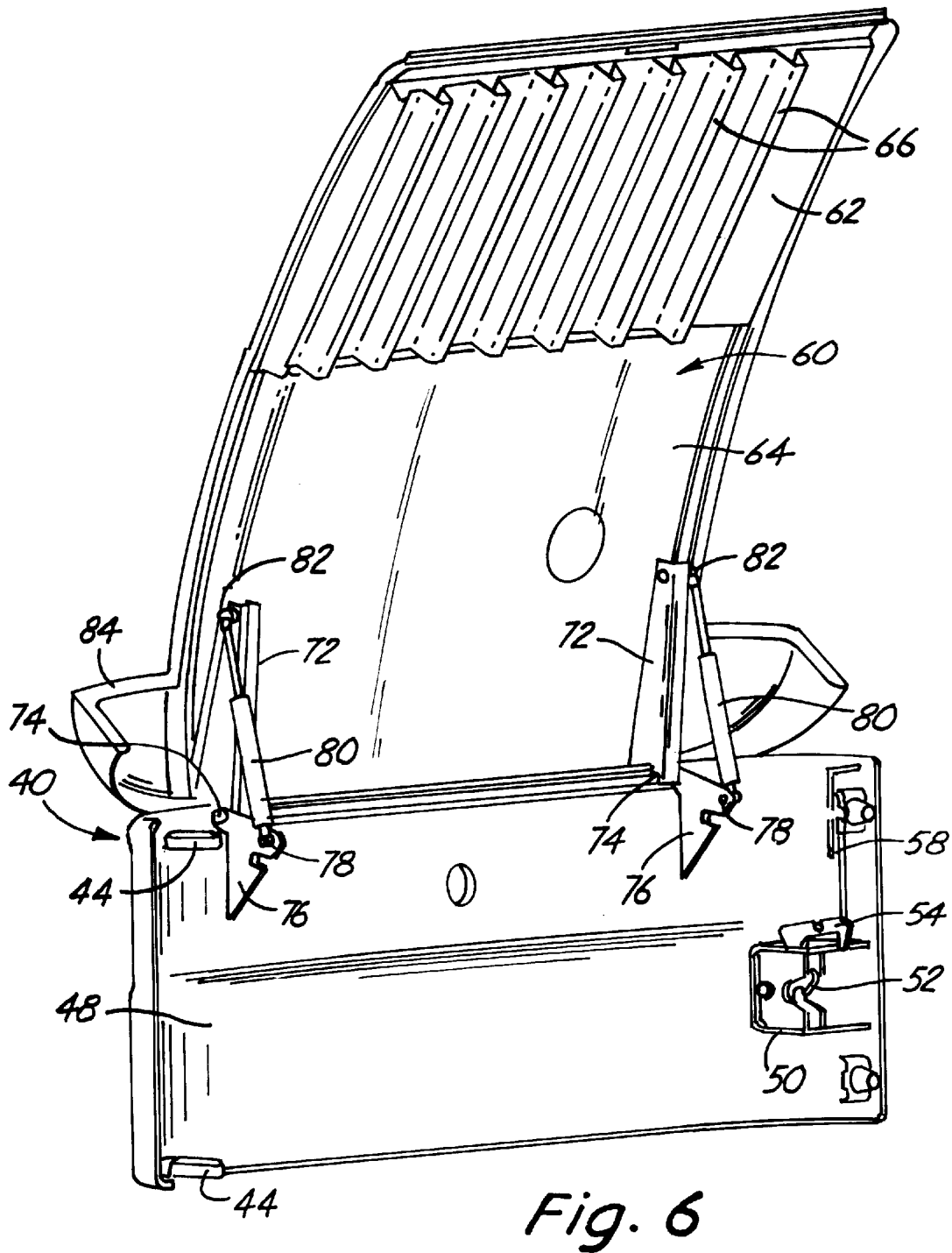
FIG. 6 is a front perspective view of the tailgate and engine cover of the present invention removed from the skid steer loader and showing the engine cover in a fully raised position as it would be with the tailgate in a closed position.

The tailgate and engine cover assembly 40 includes an engine cover panel 60 which is shown perhaps in most detail in FIGS. 5 and 6. The engine cover panel 60 includes a pair of generally planar panel sections 62 and 64. The panel section 62 has reinforcing ribs 66 thereon, for stiffening, and this panel section overlies an intermediate section 70 of the skid steer loader that will house cooling fans, an engine radiator, an air conditioning condenser and a hydraulic reservoir. The intermediate section 70 requires service (refilling cleaning, and filter service) because it houses the hydraulic tank so the engine cover panel 60 pivots upwardly relative to the tailgate 48 for access to components below. The engine cover panel 60 also moves with the tailgate. The rear cover panel section 64 directly overlies the engine housing 16, and includes a recess 68 for a light, and openings for exhaust pipes, and vents, if desired.

The rear cover panel section 64 of the engine cover panel 60 has support arms 72 fixed thereto, and these support arms are pivotally mounted on pivot pins 74 supported on brackets 76 which are fixed to the tailgate 48 spaced inwardly from the edges of the tailgate. The pins 74 can be of any desired shape, and the bracket 72 can be recessed to provide clearance for the pivoting action when the cover panel 60 moves from its closed position generally shown at FIG. 5 to its fully open position shown in FIG. 6.

The brackets 76 have outer end portions 78 that are used for mounting ends of a pair of gas springs 80. The gas spring extension rod is connected as at 82 to the outer ends 78 of the brackets 72 and the base ends are mounted on the tailgate. The gas springs will provide a force tending to urge the engine cover panel 60 to its open position when the engine cover panel is unlatched.

Additionally, the engine cover panel 60 can carry formed styling panels 84, that provides rounded corners and streamlined look at the rear portion of the tailgate 48.

The engine cover panel 60 can also, thus, be pivoted about a horizontal axis of the pins 74 relative to the tailgate 48, independently of the position of the tailgate. That is, the tailgate can be closed, and the engine cover panel 60 can be pivoted upwardly.

The tailgate 48 then can be released or unlatched so that it will pivot about the vertical axis 46, to its full open position as shown at FIG. 3. The tailgate will extend rearwardly, and can actually pivot somewhat to the side of the loader because of the shape of the hinge members 44, for access to the interior loader compartments.

As shown, the cab 30 is mounted to the frame 12 on pivots 32, at the forward end of the frame 12. The pivots 32 are formed on upright supports 88, and securely hold the cab 30 in position for pivotal movement.

In FIG. 3, side panels of the cab are shown with a coarse open screen, while FIG. 1 illustrates the side panel of the cab as being clear window. Either type of opening will work.

Figure 7:
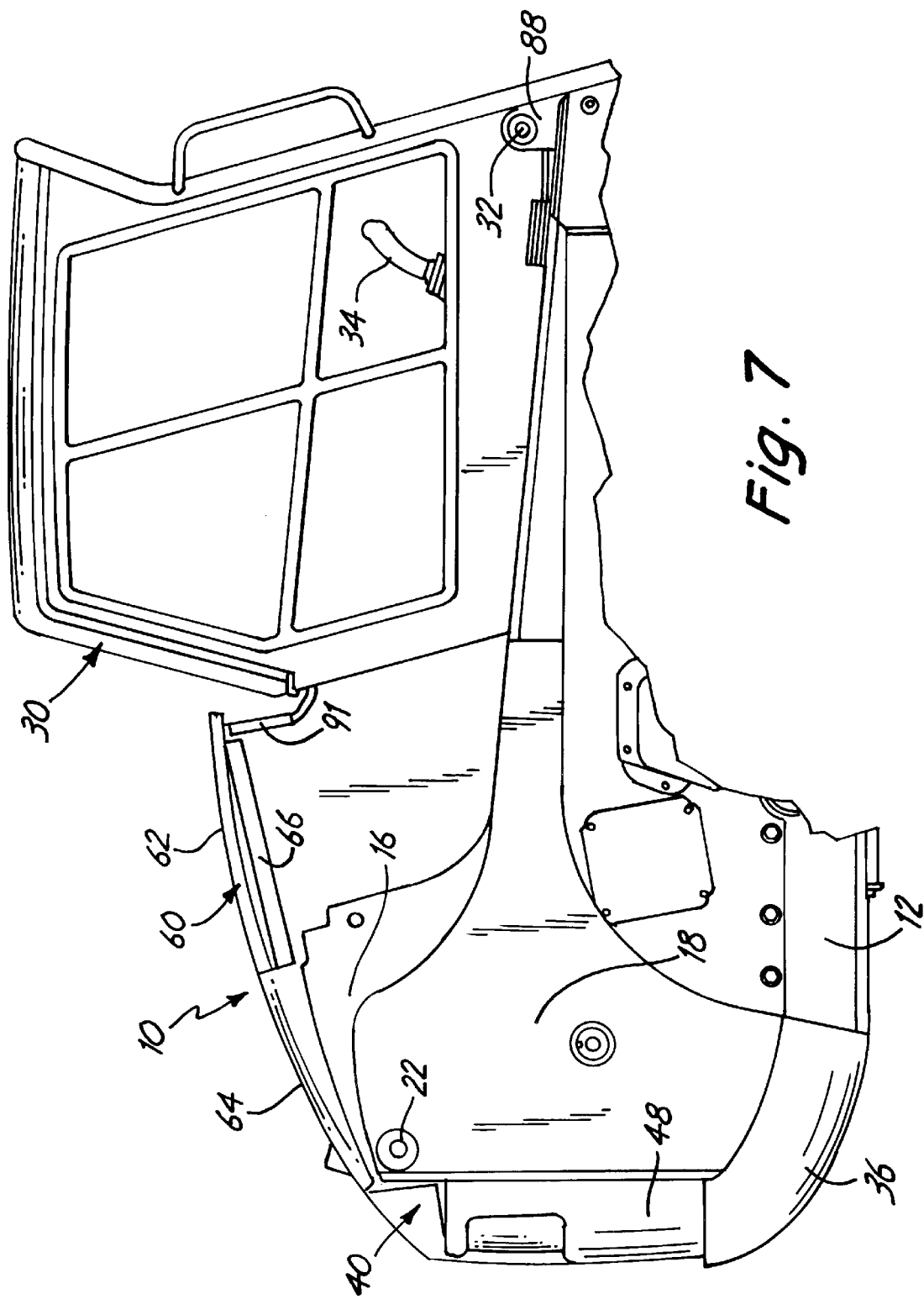
FIG. 7 is a schematic side elevational view with the engine cover substantially closed, and showing the interference with the cab latch before the cab latch levers are in position, a cab latched to prevent the engine cover from being fully closed until the cab is latched securely.

Cab 30 is made so that it can be supported in its open position as shown in FIG. 3, for access to components below the cab. The cab includes a latch 90 that will latch onto a member or members on the frame, when the cab is in its operating position as shown in FIG. 1. This cab latch is to hold the cab in its operating position. The cab latch is opened and latched with levers 91. As shown in FIG. 7 the lever is in an open position so that even if the cab appears to be down, but is not locked or latched, the engine cover panel 60 will hit the lever and cannot close.

The engine cover panel 60 has a latch rod at the forward end thereof that mates with a cover panel latch 96 as shown in FIG. 5. Latch 96 is mounted to the rear wall of the cab and grasps the latch rod at the front edge of the engine cover panel in the cab. The latch will not lock with its mating member unless the cab is fully seated and locked. As represented schematically in FIG. 7, when the cab latch lever is in its unlocked position shown. The cab presents the latch a barrier to closing the engine cover panel 60 completely. An operator thus will not close the engine cover panel 60 and forget to lock the cab in working position. The arrangement ensures that the operator will be reminded that the cab has to be fully latched and locked for operation of the skid steer loader. The engine cover latch 96 is released with a release member on the interior of the cab.

The forward pivoting cab 30 in combination with the rearward pivoting engine cover panel 60 provides for this type of interference unless the cab is fully seated.

The tailgate 48, again, can be made to carry a counterweight as desired and will operate in a normal manner for tailgates, but carries an engine cover that will shield and protect components positioned to the rear of the cab such as the cooling fan, radiators, and the engine itself any breather tubes or filters, or the like can be covered not only for enhancing the overall appearance of the loader, but also for providing protection for such components during use of the loader.

Although the present invention has been described with reference to preferred embodiments, workers skilled in the art will recognize that changes may be made in form and detail without departing from the spirit and scope of the invention.

What is claimed is:

1. A combined engine cover and tailgate for a work vehicle having a frame, the tailgate having hinge members along one lateral uprightly extending edge thereof, and the engine cover being pivotally mounted to an upper edge of the tailgate when the tailgate is supported on its hinge members, the engine cover having at least one panel that extends from the tailgate and is positioned to overlie portions of a work vehicle supporting the tailgate.

2. The combined tailgate and engine cover of claim 1 wherein said engine cover is carried with the tailgate when the tailgate is pivoted about its hinge members relative to its work vehicle frame, and a force generator between the tailgate and engine cover to support the engine cover in position extending from the tailgate.

3. The combined engine cover and tailgate of claim 1 and a latch on an opposite lateral side of the tailgate from the hinge members for latching the tailgate in position on the frame.

4. The combined engine cover and tailgate of claim 3, and an engine cover latch at a forward edge of the engine cover for latching onto a portion of the work vehicle and holding the engine cover in a closed position.

5. The combined engine cover and tailgate of claim 4 wherein said engine cover is supported on the tailgate about a generally horizontal axis in use, and at least one spring urging the engine cover to raise about the horizontal axis.

6. The combined engine cover and tailgate of claim 5 wherein said spring is a gas spring.

7. A combined engine cover and tailgate for a self-propelled work machine having a forward working tool and supporting the tailgate including a tailgate panel of size to extend across a lateral dimension of a machine at rear portions thereof, support hinges on one edge of the tailgate for attachment to a machine frame, a latch on an opposite edge of the tailgate for securing the tailgate in a closed position relative to a machine on which it is mounted, and an engine cover panel supported on an upper edge of the tailgate about a generally horizontal pivotal axis, and movable from a position extending generally horizontally, to a raised position.

8. The combined engine cover and tailgate of claim 7, wherein there are a pair of springs for urging the engine cover to its raised position.

9. The combined engine cover and tailgate of claim 7 and a latch to hold the engine cover in a closed position at an edge of the engine cover opposite from an edge pivotally supported on the tailgate.

10. The combined engine cover and tailgate of claim 7, and a styling panel carried by the tailgate on an upperside thereof having rounded corners formed to blend with side panels of machine on which it is mounted.

11. A combination loader and tailgate assembly, said loader having a frame and a rear mounted engine, the tailgate including a tailgate panel that has a hinge connection to the loader frame on one lateral side thereof, and wherein the tailgate moves from a closed position extending across a lateral width of the loader to an open position, an engine cover panel for covering the rear mounted engine, the engine cover panel being pivotally mounted to an upper edge of the tailgate along a generally horizontal axis that extends transversely of the loader when the tailgate is in its closed position, the cover panel being pivotally movable, from a position where it closely overlies the rear mounted engine, to a position where a front edge thereof is raised from the engine compartment of the loader.

12. The combination of claim 11 and a pair of springs for urging the engine cover panel to its raised position.

13. The combination of claim 11, and a latch on an opposite edge of the tailgate from the hinge connection, to latch the tailgate in a closed position on the loader frame.

14. The combination of claim 12, wherein said springs comprise gas springs.

15. A combined engine cover and tailgate for a work vehicle having a frame, a rear mounted engine and a working tool, the frame supporting the tailgate at a rear thereof, a tailgate panel of size to extend across a lateral dimension of a work vehicle at rear portions thereof, support hinges on one edge of the tailgate for attachment to the frame, a latch on an opposite edge of the tailgate for securing the tailgate in a closed position relative to the frame on which it is mounted, and an engine cover panel supported on an upper edge of the tailgate about a generally horizontal pivotal axis, and movable from a position extending forwardly from the tailgate to cover the rear mounted engine to a raised position.

\* \* \* \* \*

UNITED STATES PATENT AND TRADEMARK OFFICE
CERTIFICATE OF CORRECTION

| | |
|---|---|
| PATENT NO. | : 6,733,062 B1 |
| DATED | : May 11, 2004 |
| INVENTOR(S) | : Albright et al. |

Page 1 of 1

It is certified that error appears in the above-identified patent and that said Letters Patent is hereby corrected as shown below:

Column 5,
Line 25, insert -- a -- after "of".

Signed and Sealed this

Fifth Day of October, 2004

JON W. DUDAS
*Director of the United States Patent and Trademark Office*